US012676871B2

(12) United States Patent
Fletcher

(10) Patent No.: US 12,676,871 B2
(45) **Date of Patent: \*Jul. 7, 2026**

(54) COMPUTER SECURITY AND METHODS OF USE THEREOF

(71) Applicant: Quantum Information Security, LLC, Everett, WA (US)

(72) Inventor: Timothy Fletcher, Everett, WA (US)

(73) Assignee: Quantum Information Security, LLC, Everett, WA (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/912,102

(22) Filed: Oct. 10, 2024

(65) Prior Publication Data

US 2025/0039200 A1     Jan. 30, 2025

Related U.S. Application Data

(63) Continuation of application No. 17/083,653, filed on Oct. 29, 2020, now Pat. No. 12,143,403, which is a continuation of application No. 16/855,658, filed on Apr. 22, 2020, now Pat. No. 10,826,924.

(51) Int. Cl.
*H04L 29/00* (2006.01)
*H04L 9/40* (2022.01)

(52) U.S. Cl.
CPC ........ *H04L 63/1416* (2013.01); *H04L 63/062* (2013.01)

(58) Field of Classification Search
CPC .. H04L 63/1416; H04L 63/062; G06F 21/575
See application file for complete search history.

(56) References Cited

U.S. PATENT DOCUMENTS

| | | | | |
|---|---|---|---|---|
| 2 A | * | 7/1836 | Goulding | D01G 21/00 57/58.49 |
| 6,272,538 B1 | * | 8/2001 | Holden | G06F 21/31 709/227 |
| 6,895,507 B1 | | 5/2005 | Teppler | |
| 7,281,267 B2 | * | 10/2007 | Tarbotton | G06F 21/121 380/231 |
| 7,293,289 B1 | * | 11/2007 | Loc | H04W 12/122 726/22 |
| 7,360,073 B1 | * | 4/2008 | Billstrom | G06F 21/575 713/168 |
| 7,797,752 B1 | | 9/2010 | Vaidya | |
| 8,099,602 B2 | * | 1/2012 | Adams | H04L 63/061 713/176 |
| 9,294,486 B1 | * | 3/2016 | Chiang | G06F 21/55 |

(Continued)

OTHER PUBLICATIONS

International Search Report and Written Opinion for International Application No. PCT/US2021/028164, dated Jul. 30, 2021, 10 pages.

*Primary Examiner* — Don G Zhao

(74) *Attorney, Agent, or Firm* — Reinhart Boerner Van Deuren s.c.

(57) ABSTRACT

Described herein are various methods of securing a computer system. One or more methods include starting a security process after basic functionality on a computer is initiated at startup. The security process performs one or more reviews, such as audits, of the computer to verify that there have not been unauthorized changes to the computer, such as to any settings or executable files.

20 Claims, 3 Drawing Sheets

(56)                References Cited

U.S. PATENT DOCUMENTS

|  |  |  |  |  |
|---|---|---|---|---|
| 9,762,386 B1 | 9/2017 | Nassaje et al. | | |
| 10,154,032 B2 * | 12/2018 | Park | H04L 63/0876 | |
| 11,290,301 B2 * | 3/2022 | Skertic | F02C 7/26 | |
| 12,143,403 B2 * | 11/2024 | Fletcher | G06F 21/575 | |
| 2001/0011253 A1 | 8/2001 | Coley | | |
| 2003/0120918 A1 * | 6/2003 | VanDer Kamp | G06F 21/575 | |
| | | | 713/164 | |
| 2006/0031673 A1 * | 2/2006 | Beck | G06F 21/565 | |
| | | | 713/164 | |
| 2006/0150256 A1 * | 7/2006 | Fanton | H04L 63/10 | |
| | | | 726/27 | |
| 2007/0220500 A1 * | 9/2007 | Saunier | G06F 21/575 | |
| | | | 717/162 | |
| 2007/0294745 A1 * | 12/2007 | Tan | G06F 21/74 | |
| | | | 348/E5.004 | |
| 2008/0066178 A1 * | 3/2008 | Jin | G06F 21/14 | |
| | | | 726/23 | |
| 2008/0077795 A1 * | 3/2008 | MacMillan | H04L 9/3228 | |
| | | | 713/169 | |
| 2009/0055612 A1 * | 2/2009 | Sibert | G06F 12/145 | |
| | | | 711/E12.091 | |

| | | | | |
|---|---|---|---|---|
| 2010/0071054 A1 * | 3/2010 | Hart | H04L 63/1416 | |
| | | | 713/153 | |
| 2010/0082985 A1 * | 4/2010 | Adams | H04L 63/061 | |
| | | | 713/170 | |
| 2011/0265158 A1 * | 10/2011 | Cha | H04W 4/70 | |
| | | | 726/6 | |
| 2012/0060039 A1 * | 3/2012 | Leclercq | H04L 9/3265 | |
| | | | 713/189 | |
| 2012/0079596 A1 * | 3/2012 | Thomas | H04L 63/1433 | |
| | | | 726/24 | |
| 2012/0151200 A1 | 6/2012 | Beachem | | |
| 2012/0290582 A1 * | 11/2012 | Oikarinen | G06F 16/21 | |
| | | | 707/741 | |
| 2014/0380425 A1 | 12/2014 | Lockett et al. | | |
| 2015/0047007 A1 * | 2/2015 | Colnot | H04L 9/3271 | |
| | | | 726/7 | |
| 2018/0268146 A1 * | 9/2018 | Suryanarayana | G06F 21/445 | |
| 2020/0322332 A1 * | 10/2020 | Haque | H04L 63/0869 | |
| 2020/0328885 A1 | 10/2020 | Tola et al. | | |
| 2021/0173661 A1 * | 6/2021 | Cheng | H04L 9/3247 | |
| 2022/0052919 A1 | 2/2022 | Xia | | |
| 2022/0108262 A1 * | 4/2022 | Cella | G05B 17/02 | |
| 2023/0176557 A1 * | 6/2023 | Cella | G05B 13/048 | |
| | | | 700/117 | |
| 2025/0039200 A1 * | 1/2025 | Fletcher | H04L 63/062 | |

* cited by examiner

150

COMPUTER SECURITY AND METHODS OF USE THEREOF

CROSS-REFERENCE TO RELATED PATENT APPLICATIONS

This application is a continuation of U.S. application Ser. No. 17/083,653, filed Oct. 29, 2020, which is a continuation of U.S. application Ser. No. 16/855,658, now U.S. Pat. No. 10,826,924, filed Apr. 22, 2020, each of which is incorporated herein by reference in its entirety.

BACKGROUND OF THE INVENTION

The present invention relates generally to computer security. The present invention relates specifically to methods of securing a computer.

Securing computers from malware (e.g., viruses) has been practiced for almost as long as computers have existed. One approach is to use a boot control system that requires a password to unlock and decipher the computer's one or more partitions. Another approach is to run a security software process on top of an operating system, with the security software process monitoring access to the operating system, such as requests to install additional software and/or start new processes.

SUMMARY OF THE INVENTION

According to one embodiment a method of securing a computing device is described. The method includes executing a kernel subsequent to the computing device being powered on (the kernel initiates basic functionality for the computing device), and executing a security process subsequent to the kernel being initiated. Executing the security process includes performing a first audit of a first configuration of the computing device, generating an initial key based on the first audit, performing a first comparison of the initial key and a previous key that was previously saved to a hard drive memory, and initiating an enabled mode for the security process as a result of the first comparison indicating there has not been a security breach. While operating in enabled mode the security system further executes the steps of enabling read and write access for a second process (e.g., an operating system) to the hard drive memory, generating a loop key based on the initial key, performing a supplemental audit of a second configuration of the computing device, generating a supplemental key based on the supplemental audit, performing a second comparison of the supplemental key and the loop key, disabling the enabled mode for the security process as a result of the second comparison of the supplemental key and the loop key indicating a security breach, and continuing operation in the enabled mode as a result of the second comparison of the supplemental key and the loop key indicating there has not been a security breach.

In a specific embodiment, when the security process is initiated the kernel does not permit networked communications between the computing device and a second computing device. In a specific embodiment, the first configuration of the computing device includes a first plurality of files on the computing device with executable instructions, and the second configuration of the computing device includes a second plurality of files on the computing device with executable instructions. In a specific embodiment, the first configuration includes a first plurality of settings and the second configuration includes a second plurality of settings. In a specific embodiment, the first configuration includes at least a portion of the kernel. In a specific embodiment, the method of securing the computing device further includes storing the previous key (the previous key is representative of a previous audit of a third configuration of the computing device), and storing a plurality of precursor keys that are not representative of a previous audit of a configuration of the computing device. In a specific embodiment, the method of securing a computing device further includes the security process sending a signal to the kernel to enable network communications, the security process transmitting a request for a timestamp to a trusted source, the security process receiving a response to the request for a timestamp, and analyzing the time stamp. The enabled mode for the security process is initiated as a result of the analysis of the time stamp. In a specific embodiment, the second process is an operating system for the computing device. In a specific embodiment, the supplemental audit includes a list of processes being executed. In a specific embodiment, during the enabled mode the security process further executes the step of mounting at least one hard drive. In a specific embodiment, disabling the enabled mode for the security process as a result of the second comparison of the supplemental key and the loop key indicating a security breach includes performing at least three comparisons of the loop key and at least three supplemental keys before disabling the enabled mode.

According to another embodiment, a method of securing a computing device includes executing a security process on a computing device. Executing the security process includes performing a first audit of a first configuration of the computing device, generating an initial key based on the first audit, retrieving a previous key (the previous key was generated prior to the initial key), performing a first comparison of the initial key and the previous key, generating a loop key, and initiating an enabled mode for the security process as a result of the first comparison indicating there has not been a security breach. During the enabled mode the security process executes the steps of enabling a second process to access a hard drive memory of the computing device, performing a supplemental audit of a second configuration of the computing device, generating a supplemental key based on the supplemental audit, performing a second comparison of the supplemental key and the loop key, disabling the enabled mode for the security process as a result of the second comparison of the supplemental key and the loop key indicating a security breach, and continuing operating in the enabled mode as a result of the comparison of the second supplemental key and the loop key indicating there has not been a security breach.

In a specific embodiment, when the security process is initiated the kernel does not permit networked communications between the computing device and an external computing device. In a specific embodiment, the first configuration of the computing device comprises a plurality of files with executable instructions. In a specific embodiment, the method of securing the computing device further includes the security process communicating a first message to the kernel, and the kernel enabling network communications as a result of the kernel receiving the first message. In a specific embodiment, the second process is an operating system. In a specific embodiment, disabling the enabled mode for the security process as a result of the second comparison of the loop key to at least two supplemental keys before disabling the enabled mode.

Another exemplary embodiment of securing a computing device includes initiating power to a computing device (the kernel initiates basic functionality for the computing device), executing a kernel as a result of initiating power to the computing device, and executing a security process subsequent to the kernel being initiated. Executing the security process includes receiving a plurality of settings to be audited, performing a first audit of a first configuration of the computing device, generating an initial key based on the first audit, performing a first comparison of the initial key and a previous key that was previously saved to a hard drive memory of the computing device, and initiating an enabled mode for the security process as a result of the first comparison indicating there has not been a security breach. During the enabled mode the security process executes the steps of enabling read and write access for an operating system for the computing device, generating a loop key based on the initial key, periodically performing a supplemental audit of a second configuration of the computing device. The supplemental audit includes the steps of performing a supplemental audit of the plurality of settings, generating a supplemental key based on the supplemental audit, performing a second comparison of the supplemental key and the loop key, disabling the enabled mode for the security process as a result of the second comparison of the supplemental key and the loop key indicating a security breach, and continuing operating in the enabled mode as a result of the second comparison of the supplemental key and the loop key not indicating a security breach. In a specific embodiment, the first configuration comprises a plurality of files with executable instructions, a plurality of settings, and at least a portion of the kernel. In a specific embodiment, the second configuration comprises a list of processes being executed.

The accompanying drawings are included to provide further understanding and are incorporated in and constitute a part of this specification. The drawings illustrate one or more embodiments and, together with the description, serve to explain the principles and operation of the various embodiments.

DETAILED DESCRIPTION

Referring generally to this disclosure, described herein are various methods of securing a computer. In contrast to current computer software security systems, the methods and embodiments described herein both secures the system from unauthorized changes and provides a platform to confirm that only licensed software is being used.

Figure 1:
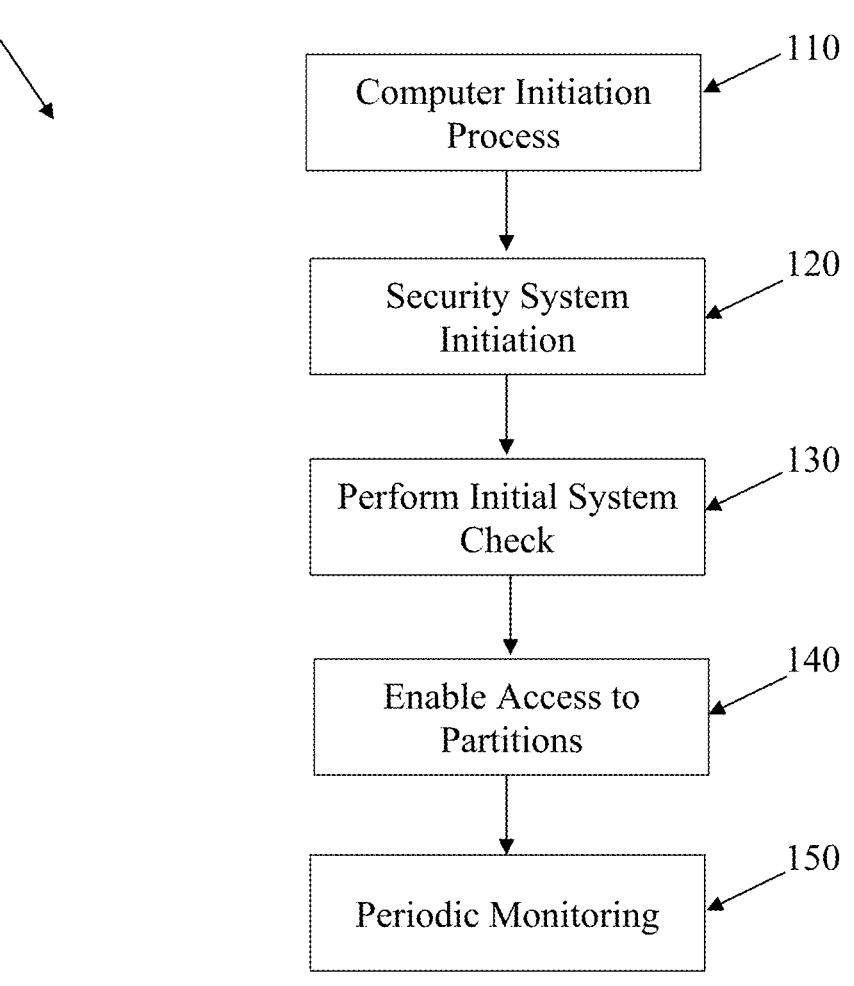
FIG. 1 is a method of securing a computing device, according to an exemplary series of processes.

Turning to FIG. 1, various aspects of a method of securing a computing device are depicted, according to an exemplary series of processes. Starting at step 110, a computer is initiated, such as for example being powered up for the first time and/or being rebooted. In another example, the computer is initiated after the security process described herein fails and restarts.

In one example the initiation process for a computer includes powering up and starting a boot process, sometimes referred to as a kernel, that initiates basic system functionality, such as enabling communication between the memory, the bus, and the processor. In a specific embodiment, the kernel initially loads most and/or all basic functionality other than input/output functionality (e.g., such as most and/or all functionality other than receiving input from a keyboard, receiving input from a mouse, receiving input from a network card, and sending output to a display). In another specific embodiment the kernel initially only loads basic functionality providing communications between memory (e.g., hard drive, RAM, cache) and the processor(s). In another specific embodiment, the kernel provides additional functionality, such as enabling the network card, but the network card is initially not permitted to open network connections. In another specific embodiment, the network card is enabled and initially permitted to open only a single network connection that is used by the security system, as described below.

After a basic set of functions are enabled on the computer, the security system process is initiated, such as by the kernel initiating the security system process (step 120). The security system protects the computer from bad actors (e.g., hackers, illicit data collectors, etc.).

The security system starts by performing an initial system check of the computing device, such as of a computer (step 130). As will be described in more detail below, the initial system check, or audit, reviews the status of one or more aspects of the computer, such as whether any executable files and/or procedure files (e.g., DLL files, libraries) have been changed, whether any settings for the computing device have changed, etc.

If the initial system check does not uncover an indication of a security breach, errors and/or hacking attempts, the remainder of the hard drive(s) is enabled for access (step 140), such as by mounting the one or more partitions. In a specific embodiment, as a result of the security system not uncovering a security breach, the security system sends a signal to initiate another process, such as an operating system for the computer. In another specific embodiment, as a result of the security system not uncovering a security breach, the security system sends a signal for the kernel to enable read and write access to the hard drive(s), such as to the portions of the hard drive that were previously inaccessible for read and write access. In yet another specific embodiment, as a result of the security system not uncovering a security breach, the security system initiates a process, such as an operating system, and sends a signal for the kernel to enable read and write access to the hard drive(s) by the initiated process (e.g., the operating system), such as to portions of the hard drive that were previously inaccessible for read and write access. It is contemplated herein that in one or more embodiments the hard drive(s) include one or more non-transitory computer-readable storage media, and more particularly non-volatile memory (e.g., memory that retains data even when not receiving power). The security system will then periodically check the status of the computer (step 150) to confirm that the computer has not been hacked and/or there has not been unauthorized access or edits to the files and settings reviewed by the security system.

In one or more embodiments, the security system transmits a request for the current date/time, such as a time stamp that includes both the date and time, to a hard-coded network address (e.g., a fully qualified domain name, an IP address (and optional specific port), a URL (and optional specific port)). A remote process running at the destination generates data that includes the current date and time, signs the data, and transmits the signed data back to the security system. Because the data is signed by the remote process (e.g., via public key/private key), the security system can confirm that the response received by the security system was sent by the remote system, and review that data to receive an indication of the correct current date and time. By these series of steps, the security system can confirm to an extent that the security system is not running on an emulated environment and being told the incorrect date and time, and thus the security system can confirm to some degree of confidence that the computer the security system is running on is not an artificial environment and being repeatedly stopped and started to try to hack and/or get around the security system. If the date/time check fails, then the security system has determined that there is a security breach for this computer and further operation of the computer is not permitted.

In various embodiments there are three general times that an audit may be performed: at system startup (Initial Audit), at the start of the security system functioning in an enabled mode (Baseline Audit), and periodically while the security system functions in the enabled mode (Periodic Audit). The results of the Initial Audit are compared to the results of a previous audit to determine whether the security system has identified a security breach, and if not, the security system permits the computer to continue to operate (e.g., to load the operating system). In situations in which the computer is permitted to continue operating, the Baseline Audit is used as a benchmark for the security system to periodically check for a security breach. More particularly, the results of the Baseline Audit are compared to the results of subsequent Periodic Audits to determine if the security system has identified a security breach.

In various embodiments the Initial Audit, the Baseline Audit, and the Periodic Audit all include reviewing the same files and settings. In various alternate embodiments, the Initial Audit includes the security system reviewing a first plurality of files and settings, and the Baseline Audit and the Periodic Audit include reviewing a second plurality of files and settings that is different than the first plurality of files and settings.

In one example the first plurality of files and settings identifies additional content that is not identified by the second plurality of files and settings. In another example the second plurality of files and settings identifies additional content that is not identified by the first plurality of files and settings. In yet another example the first plurality of files and settings and the second plurality of files and settings each identify some content not included in the other, in addition to content that is included in each.

In various exemplary processes, the Initial Audit, the Baseline Audit, and the Periodic Audit include an audit of static operating systems files and/or settings (Static Configuration Settings), an audit of dynamic operating systems files and/or settings (Dynamic Configuration Settings), and an audit of security and kernel configuration files and/or settings (Security Configuration Settings and Path Configuration Settings).

Figure 2:
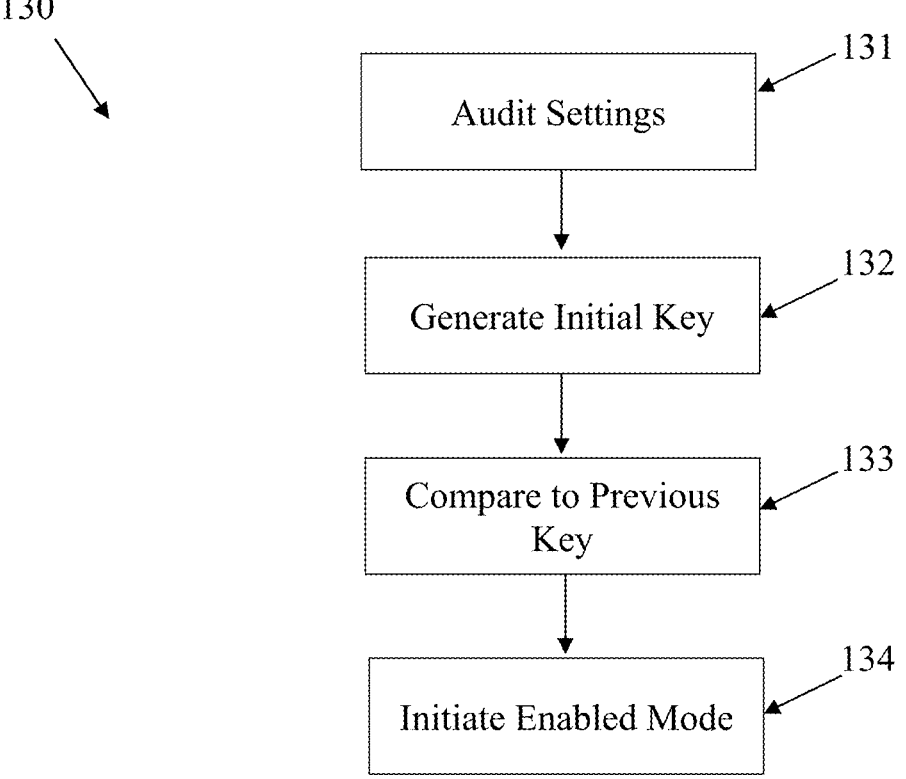
FIG. 2 is a method of performing an initial system check, according to an exemplary series of processes.

As mentioned above, the Initial Audit may include reviewing different files and settings than are reviewed for the Baseline Audit and the Periodic Audit. Thus, the Static Configuration Settings, the Dynamic Configuration Settings, the Security Configuration Settings, and the Path Configuration Settings reviewed for the Initial Audit may include reviewing different files and settings than the Static Configuration Settings, the Dynamic Configuration Settings, the Security Configuration Settings, and the Path Configuration Settings reviewed for the Baseline Audit and the Periodic Audit. It is to be understood that the Baseline Audit and the Recurring Audit review the same settings and/or files, and by this way the results of the Baseline Audit can be reliably compared to the results of the Recurring Audit and any differences are therefore an indication of a possible security breach Turning to FIG. 2, described herein are various aspects of performing the initial system check (step 130). Starting at step 131, the settings are audited, such as by the security system performing an Initial Audit. In one or more methods of use the security system performs the Initial Audit by reviewing the Static Configuration Settings, the Dynamic Configuration Settings, the Security Configuration Settings, and the Path Configuration Settings associated with the Initial Audit.

Turning to step 132, in one method of use the audit of the Static Configuration Settings generates a first key, the audit of the Dynamic Configuration Settings generates a second key, and the collective audit of the Security Configuration Settings and the Path Configuration Settings generates a third key. The first, second and third keys are each signed by the security system, thereby generating a signed first key, a signed second key, and a signed third key, respectively. The signed first, signed second and signed third keys are then combined to form an initial key.

The initial key is compared to a previously-saved key (step 133). That comparison determines whether the security system has identified a security breach. If the security system does not detect a security breach, then the enabled mode is initiated. During enabled mode (step 134), the security system permits the network card to open new connections, enables functionality for other input/output devices, such as the keyboard, mouse, and/or a display, and starts a subsequent process, such as an operating system for the computer. In one or more embodiments, the operating system is running on a portion of memory that is encrypted.

Figure 3:
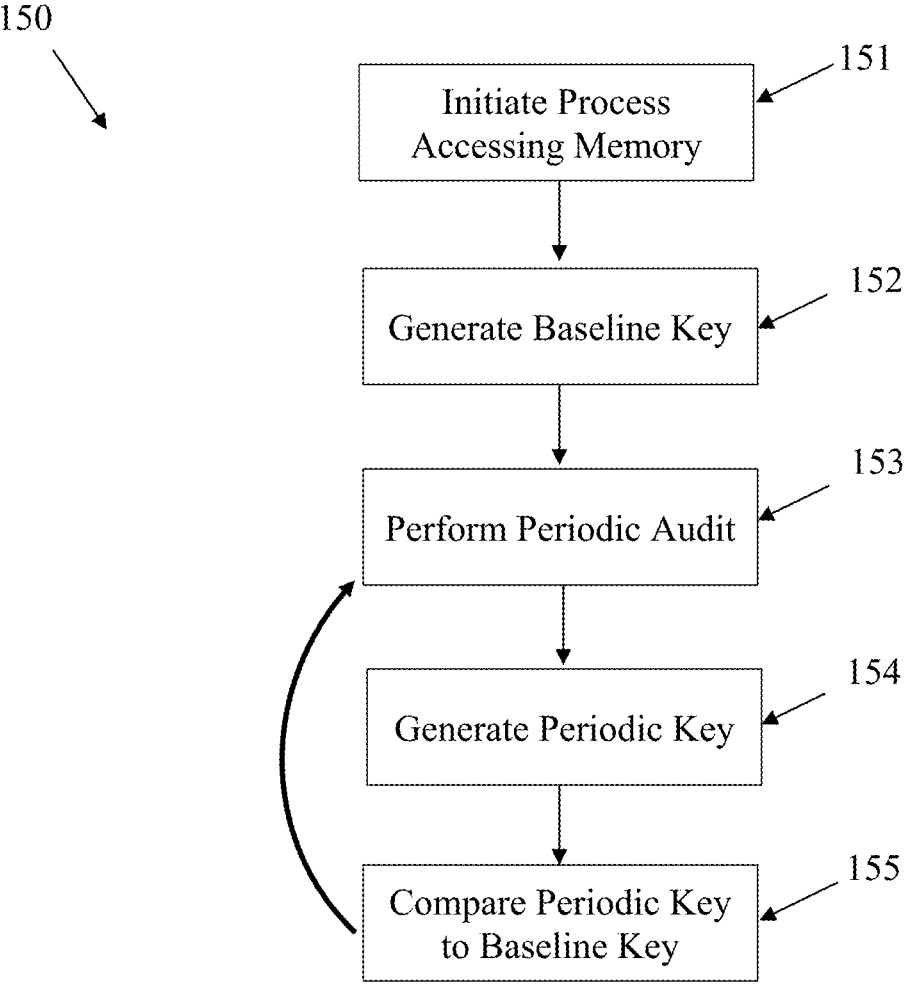
FIG. 3 is a method of initiating an enabled mode, according to an exemplary process.

Turning to FIG. 3, described herein are various aspects of the security system permitting the computer to operate in enabled mode (step 150). Starting at step 151 a process accessing memory is initiated, such as an operating system for a computer. At step 152, a baseline key is generated, such as by performing a Baseline Audit. The security system generates the baseline key as a baseline measurement of the system to be compared against keys generated by subsequent audits.

In one exemplary process of generating the baseline key via a Baseline Audit, a first key is generated based on an audit of the Static Configuration Settings associated with the Baseline Audit, a second key is generated based on an audit of the Dynamic Configuration Settings associated with the Baseline Audit, and a third key is generated based on the audits of the Security Configuration Settings and the Path Configuration Settings associated with the Baseline Audit. The first key, the second key and the third key are each signed by the security system, thereby generating a signed first key, a signed second key, and a signed third key, respectively. The signed first key, signed second key and signed third key are then combined to form the baseline key, which is used during the security loop (step 152).

As noted above, the initial key is relied on by the security system as a baseline measurement to compare subsequent audits to. After a period of time, the security system performs a supplemental audit (step 153), such as by performing a Periodic Audit to generate a current running key. The supplemental audit may be initiated as a result of a certain period of time passing (e.g., 15 seconds), a circumstance arising (e.g., a period of low processor and/or memory utilization thereby permitting the audit to be performed with a reduced effect on the user's experience), and/or by an event occurring (e.g., after a certain portion of memory is accessed via a read and/or write command). In one or more embodiments the supplemental audit is performed periodically until the computer is turned off and/or the supplemental audit discovers a security breach.

In one exemplary process of generating the current running key via a Periodic Audit, a first key is generated based on an audit of the Static Configuration Settings associated with the Periodic Audit, a second key is generated based on an audit of the Dynamic Configuration Settings associated with the Periodic Audit, and a third key is generated based on the audits of the Security Configuration Settings and the Path Configuration Settings associated with the Periodic Audit. Because there may be processes being executed by the computer while the Periodic Audit and the Baseline Audit are being performed, so therefore the a list of the processes being executed may be included as part of these audits (e.g., as part of the Dynamic Configuration Settings).

The first key, the second key and the third key are each signed by the security system, thereby generating a signed first key, a signed second key, and a signed third key, respectively. The signed first key, signed second key and signed third key are then combined to form the current running key (step 154). The supplemental audit is compared to the initial running key (step 155) to determine whether there is an indication of a security breach. In a specific embodiment, there is an indication of a security breach when the data being audited has been revised, deleted and/or added to. If the comparison does not detect a possible security breach, the security system reverts to step 153 after a period of time, as discussed above. If the comparison does detect a possible security breach activity, the security system triggers an error condition.

In the event the security system triggers an error condition, in one exemplary process the security system transmits an error message and shuts the computer down. In another exemplary process the security system performs one or more additional supplemental audits before shutting the computing down (e.g., an additional three supplemental audits are performed and if any of them indicate a security breach then the computer is shut down).

The following is an exemplary process for generating Static Configuration Settings, the Dynamic Configuration Settings, the Security Configuration Settings, and the Path Configuration Settings for the Initial Audit. Although this example relates to a computer running a version of the operating system Microsoft Windows®, it will be understood that this process may be performed with any operating system and still practice the spirit of this exemplary process. To identify the files and settings that should be included in audits, the computer is operated in a manner known to be safe. An Initial Audit is performed and a key is generated, such as according to the exemplary processes described herein. In this Windows-centric example, the audit of the Static Configuration Settings includes reviewing the Local_Machine (HKLM) portion of the registry, the audit of the Dynamic Configuration Settings includes reviewing the Users (HKU) portion of the registry, the audit of the Security Configuration Settings includes reviewing the Current_Config portion of the registry and the audit of the Path Configuration Settings includes reviewing the C:\WINDOWS\ folder.

The key generated by this iteration of the Initial Audit is compared to a key generated by a previous iteration of performing an Initial Audit. Because the computer has been operated in a known safe manner, any deviations between the keys are therefore likely false indications of a security breach. Therefore, those portions of the files and settings that generated the deviations are removed from the Static Configuration Settings, the Dynamic Configuration Settings, the Security Configuration Settings and/or the Path Configuration Settings. This process is repeated until false indications of a security breach are rarely or never identified by the Initial Audit.

The process to generate the Static Configuration Settings, the Dynamic Configuration Settings, the Security Configuration Settings, and the Path Configuration Settings for the Baseline Audit and the Periodic Audit is similar to the above-described process relating to the Initial Audit. As noted above, it is to be understood that the Baseline Audit and the Periodic Audit use the same or mostly the same Static Configuration Settings, the Dynamic Configuration Settings, the Security Configuration Settings, and the Path Configuration Settings, and by this way the results of the Baseline Audit can be reliably compared to the results of the Periodic Audit and any differences are therefore an indication of a possible security breach.

In one example, the multiple iterations of operating the computer to identify the plurality of settings to be audited includes operating the computer in many different situations to identify all and/or most of the situations in which false positives are generated. For example, one iteration includes the user changing the default home webpage for a browser. Because that action should be permitted, the files and/or settings modified by that revision are excluded from the list of items to be audited. In another example, one iteration includes the user changing the volume of the speakers. Again, because that action should be permitted the files and/or settings modified by that revision are excluded from the list of items to be audited.

Another exemplary process for utilizing this disclosure in a Linux environment is described. In this example, the audit of the Static Configuration Settings includes reviewing the /etc/ folder, the audit of the Dynamic Configuration Settings includes reviewing the subfolders in the /etc/ folder other than the /etc/shadow file and subfolder, the audit of the Security Configuration Settings includes reviewing the /etc/ shadow file and folder, and the audit of the Path Configuration Settings includes reviewing the /opt/ folder.

In one or more embodiments when a user elects to update software on the protected computer and/or install new software on the protected computer, as a first step the user indicates to the security system that software is being updated/installed. The software is then updated/installed. After the installation is complete, the security system is reinitiated and performs a new audit of the settings. This new audit is used to create a new initial key, which is used as the baseline for future comparisons of future audits (e.g., by performing a new Initial Audit), and a new baseline key (e.g., by performing a new Baseline Audit). By these exemplary series of steps the security system does not raise a false flag of a security breach (e.g., identifying the modifications resulting from the valid software installation as an activity by a bad actor).

For exemplary purposes only and without limitation it is contemplated herein that the computing device may be a desktop, a laptop, a personal electronic device (e.g., cell phone, tablet, smartwatch), a thin client, a virtual machine on a larger physical machine (or machines) that hosts one or more multiple virtual machines, an embedded system (e.g., a computer within a car, a computer within a vehicle, a computer within a device and/or tool), and/or a server.

In various embodiments, the computer includes one or more of a processor, a memory, an output interface, and an input interface. The one or more of a processor is one or more of a general processor unit, an ASIC, a Field Programmable Gate Array (FPGA), firmware and/or a graphics processor. The memory is one or more of a hard drive, a RAM, and/or a processor cache. The output interface is one or more of a network interface card, and/or a display. The input interface is one or more of a keyboard, a mouse, a network interface card (which may also function as an output interface card), and/or touchscreen display. It is further considered herein that computer network over which communications occur may be one or more of an intranet, the Internet, and/or any electronic network of one or more computing devices. It is contemplated herein that any computer device may practice this disclosure, including, for exemplary purposes only and without limitation, a cell phone, a smartwatch, a tablet, a laptop, and/or a desktop.

In a specific embodiment, the steps of this disclosure are practiced by a system, such as a computing device, that includes at least one processor and a memory storing instructions that, when executed by the at least one processor, cause the system to perform one or more of the steps and/or processes described herein.

In another specific embodiment a system, such as a computing device, includes at least one processor and a memory, such as a non-transitory computer-readable storage medium including instructions that, when executed by the at least one processor, cause the system to perform one or more of the steps and/or processes described herein.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A method of securing a computing device comprising steps of:

executing a kernel on the computing device, wherein the kernel initiates basic functionality for the computing device; and executing a security process, wherein when the security process is initiated the kernel permits limited networking functionality for the computing device, wherein initiating executing the security process comprises steps of:

performing a first audit of a first configuration of the computing device;

generating an initial key based on the first audit;

performing a first comparison of the initial key and a previous key that was previously generated;

analyzing a timestamp to determine whether the security process is being run on a computer that has a security breach via analyzing the timestamp to determine if the security process is being told an incorrect date and time; and initiating an enabled mode for the security process based on a result of analyzing the timestamp and as a result of the first comparison indicating there has not been a security breach, thereby enabling unlimited network communications between the computing device and other devices.

2. The method of claim 1, wherein the first configuration of the computing device comprises a first plurality of files on the computing device with executable instructions, and wherein the first configuration comprises at least a portion of the kernel.

3. The method of claim 1, wherein the first configuration of the computing device comprises a first plurality of files on the computing device with executable instructions.

4. The method of claim 1, wherein the first configuration comprises at least a portion of the kernel.

5. The method of claim 1, wherein during the enabled mode the security process further executes a step of mounting a hard drive.

6. The method of claim 1, wherein during the enabled mode the security process further executes a step of enabling new network connections to be opened.

7. The method of claim 1, wherein during the enabled mode the security process further executes a step of enabling functionality for at least one peripheral device coupled to the computing device.

8. The method of claim 1, wherein the first configuration comprises a plurality of settings and at least a portion of the kernel.

9. The method of claim 1, wherein during the enabled mode the security process further executes steps of:

enabling read and write access for a second process to a hard drive memory of the computing device;

generating a loop key;

performing a supplemental audit of a second configuration of the computing device;

generating a supplemental key based on the supplemental audit;

performing a second comparison of the supplemental key and the loop key;

disabling the enabled mode for the security process as a result of the second comparison of the supplemental key and the loop key indicating a security breach; and continuing operating in the enabled mode as a result of the second comparison of the supplemental key and the loop key indicating there has not been a security breach.

10. The method of claim 9, wherein the second process is an operating system for the computing device.

11. The method of claim 10, wherein the second configuration comprises a list of processes being executed.

12. A method of securing a computing device comprising steps of:

initiating an enabled mode for a security process, wherein when the security process is initiated a kernel permits limited networking functionality, wherein during the enabled mode the security process periodically executes steps of:

enabling a second process to access a hard drive memory of the computing device;

performing a first audit of a first configuration of the computing device;

generating a first key based on the first audit;

receiving a loop key;

performing a first comparison of the first key and the loop key;

analyzing a timestamp to determine whether the security process is being run on a computer that has a security breach via analyzing whether the timestamp is the correct time;

disabling the enabled mode for the security process as a result of at least one of the first comparison of the first key and the loop key and the analyzing the timestamp indicating a security breach; and continuing operating in the enabled mode as a result of both of the first comparison of the first key and the loop key and the analyzing the timestamp indicating there has not been a security breach, thereby enabling unlimited network communications between the computing device and other devices.

13. The method of claim 12, wherein the second process comprises an operating system for the computing device, further comprising a step of executing the kernel on the computing device, wherein the kernel initiates basic functionality for the computing device.

14. The method of claim 13, wherein during the enabled mode the security process further executes a step of enabling new network connections to be opened, and wherein the first configuration comprises at least a portion of the kernel.

15. The method of claim 13, wherein during the enabled mode the security process further executes a step of enabling new network connections to be opened.

16. The method of claim 13, wherein the first configuration comprises at least a portion of the kernel.

17. The method of claim 12, wherein during the enabled mode the security process further executes a step of mounting a hard drive.

18. A method of securing a computing device comprising steps of:

executing a security process, wherein when the security process is initiated a kernel permits limited networking functionality of only being permitted to open a single network connection, wherein executing the security process comprises steps of:

performing a first audit of a first configuration of the computing device;

generating an initial key based on the first audit;

analyzing a timestamp to determine whether the security process is being run on a computer that has a security breach via analyzing whether the timestamp indicates the incorrect time;

performing a first comparison of the initial key and a previous key that was previously generated; and initiating an enabled mode for the security process as a result of both the first comparison and the analyzing the timestamp indicating there has not been a security breach, thereby enabling unlimited network communications between the computing device and other devices.

19. The method of claim 18, wherein during the enabled mode the security process further executes a step of enabling new network connections to be opened.

20. The method of claim 18, wherein during the enabled mode the security process further executes a step of enabling functionality for at least one peripheral device coupled to the computing device.

\* \* \* \* \*